Nov. 25, 1947.                D. V. HORNSBY                2,431,480
                               LOCK WASHER
                            Filed Dec. 26, 1944

Inventor
Denis V. Hornsby
By
Attorney

Patented Nov. 25, 1947

2,431,480

UNITED STATES PATENT OFFICE 2,431,480

LOCK WASHER

Denis V. Hornsby, Columbus, Ohio

Application December 26, 1944, Serial No. 569,697

1 Claim. (Cl. 151—53)

This invention relates to an improved lock washer for positively retaining threaded bodies, such as screw plugs, caps and the like, against rotation and loss when the same are operatively positioned in structures subject to considerable vibration when in use.

While my improved washer, comprising the present invention, may be employed in many other capacities, one of its practical and specific fields of use resides in maintaining locomotive connecting rod caps or plugs in their applied or operative positions. These caps or plugs are threaded into sockets designed for the reception of lubricants employed in lubricating the bearings between locomotive connecting rods and the studs or crank pins of the track-engaging wheels. Considerable difficulty has been encountered, due to the vibration set up in the running gear of a locomotive, in maintaining these closure caps or plugs in their seated or applied positions. Vibration loosens the caps so that the same are quite frequently lost, resulting in delay and sometimes heavy repair cost in new rods and bushings. In an effort to overcome this condition, it has been customary to spot weld the caps or plugs in their applied positions, but even with this expediency, the heavy vibration frequently destroys the weld. It will be understood that when such caps or plugs unthread from their sockets, the same become dangerous missiles, particularly when they are flung from a speeding locomotive.

Accordingly, it is the object of the present invention to provide a washer of inexpensive, readily applied and positive nature for association with such threaded caps or plugs which will effectively retain the latter in their applied or operative positions, secure against loss or misplacement and one which may be used repeatedly, when the plugs or caps are removed for lubricant-inserting operations.

It is another object of the invention to provide a lock washer formed with rearwardly extending wings for engagement with the body of a locomotive rod and by means of which axial rotation of the washer is precluded when the same is in its applied position.

A further object is to provide a washer of this character formed with a bendable lip which is adapted to engage with a flat surface of the removable cap or plug such as one of the wrench-receiving surfaces thereof, to preclude rotation of said cap or plug.

For an understanding of additional objects and advantages of the invention, reference is to be had to the following description and accompanying drawings, wherein.

Figure 1:
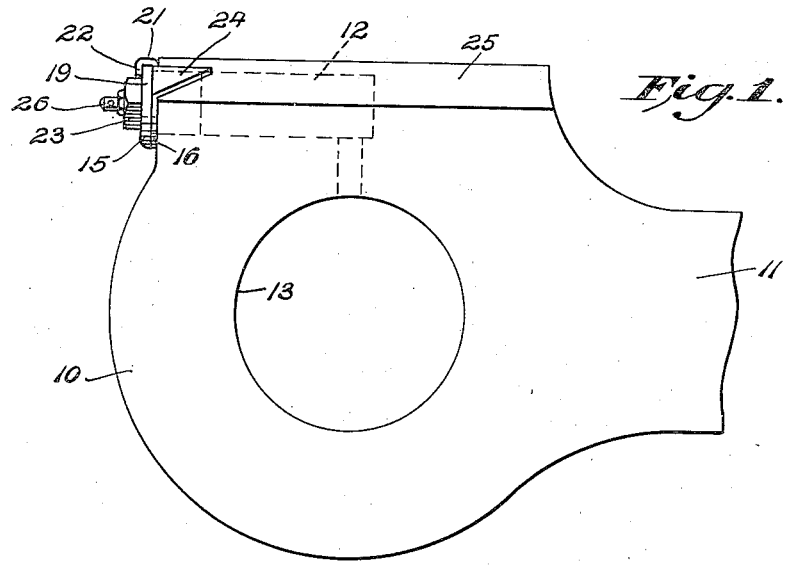
Fig. 1 is a fragmentary side elevational view of a locomotive connecting rod, disclosing the improved lock washer, forming the present invention, in its applied position thereon.
Figure 2:
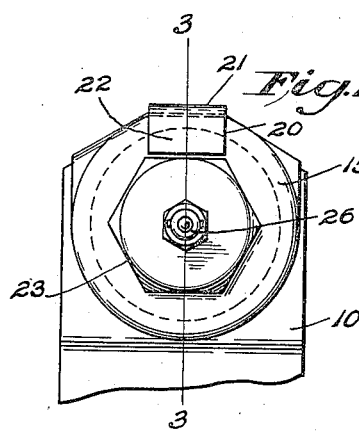
Fig. 2 is a fragmentary front elevational view of the removable lubricating cap or plug of the rod, disclosing my improved washer in locking relationship therewith.
Figure 3:
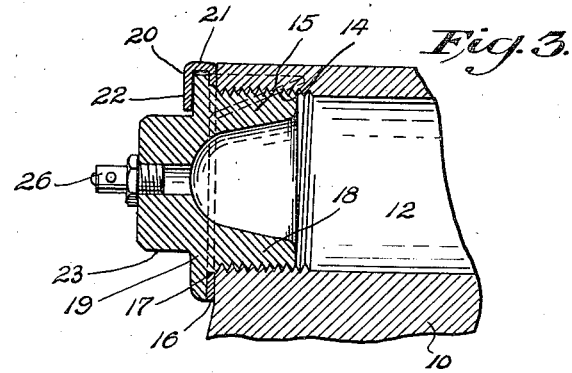
Fig. 3 is a vertical sectional view on the plane indicated by the line 3—3 of Fig. 2.
Figure 4:
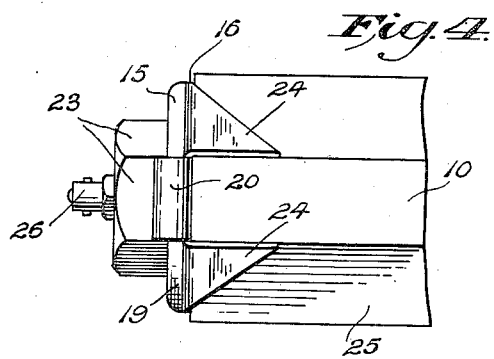
Fig. 4 is a fragmentary top plan view.

Referring more particularly to the drawings, the numeral 10 designates the crank-pin receiving end of a locomotive connecting rod 11. As usual, the end 10 is provided with an internal chamber 12 adapted for the reception of a lubricant employed in lubricating the pin-bearing, indicated at 13. To admit of the introduction of lubricant into the chamber 12, the outer end thereof is provided with internal threads 14 for the reception of a removable cap or plug 15. As previously stated, due to the severe vibration set up in the running gear of a locomotive, this cap or plug is subject to loss by accidentally unscrewing from its operative position in the end of the chamber 12, and to prevent positively such loss, I provide a novel form of locking washer 16.

Figure 5:
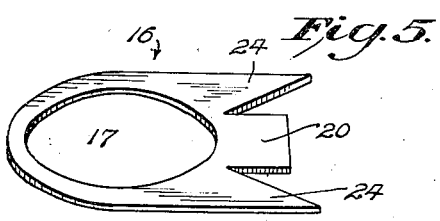
Fig. 5 is a detail perspective view of the washer blank.

As shown in Fig. 5, this washer comprises a flat metallic body of fairly heavy gauge. The body is formed with an opening 17, which receives the externally threaded boss 18 of the cap or plug 15, the body, when applied, being clamped between the annular flange 19 of the cap or plug and the flat end wall of the rod 11. The blank is formed, preferably at its top, with a bendable lip 20, so that when the cap or plug is threaded into its operative position closing the chamber 12 and clamping the washer in its applied position, the lip may be bent over the peripheral edge of the flange 19 as at 21 and thence downwardly as at 22, across the outer face of the flange 19, so that the flat lower edge of said lip will contact or be disposed immediately adjacent to one of the flat wrench-receiving surfaces 23 of the cap or plug. Also, the washer is formed with a pair of integral triangularly shaped wings 24 which, when the washer is operatively positioned, or bent rearwardly to embrace and closely engage the downwardly sloping side walls 25 of the rod 11, will preclude axial rotation of the washer and hold the lip 20 in its cap-locking position.

By this construction of the washer, a simple, effective and readily applied means is provided for retaining the cap or plug in its position of socket closure, preventing accidental loss of said cap or plug and the disadvantageous conditions which result from such loss. When it becomes necessary to replenish the lubricant supply normally contained within the lubricant chamber 12, the lip 20 is bent upwardly sufficiently to permit of the rotation of the cap or plug, so that it may be unscrewed from the outer end of the socket provided by the threaded end of the chamber 12. Following the filling of the chamber with the lubricant, and the re-insertion of the cap or plug therein, the lip is again bent downwardly to lock said cap or plug in position. However, if the threaded cap plug is provided axially with fittings, shown at 26, adapted for the reception of the flexible outlet nozzle of a grease gun, not shown, it is unnecessary to remove the cap plug, or the locking washer therefor, except at very infrequent intervals.

Having thus described my invention, I claim:

As a new article of manufacture, a locking washer for retaining a threaded plug against rotation in a body having a socket formed for the reception of the plug, said washer comprising a metallic plate provided with an opening formed for the reception of the threaded extension of the plug, the latter having an outer annular flange and a multi-sided wrench-receiving head, said plate being adapted to be confined between the flange of said plug and an adjoining flat surface of the socketed body, said plate laterally of said opening being provided with an integral centrally disposed lip which in the application of the plate is bent forwardly and downwardly over said flange so that the lower edge of the lip coacts with the wrench-receiving surfaces of said plug to restrain the latter against rotation, and said plate at each side of said lip being formed with an integral wing of substantially triangular configuration, the said wings in the use of the plate being adapted to be bent rearwardly to occupy operative planes substantially perpendicular to that of the body of the plate in which the opening is formed, whereby to position said wings in embracing relationship with opposed outer flat surfaces of the socketed body.

DENIS V. HORNSBY.

REFERENCES CITED

The following references are of record in the file of this patent:

UNITED STATES PATENTS

| Number | Name | Date |
| --- | --- | --- |
| 1,151,000 | Cowherd | Aug. 24, 1915 |
| 930,806 | Smith | Aug. 10, 1909 |
| 931,659 | Taylor | Aug. 17, 1909 |
| 1,191,208 | Margetts | July 18, 1916 |
| 1,590,487 | Williams | June 29, 1926 |

FOREIGN PATENTS

| Number | Country | Date |
| --- | --- | --- |
| 430,854 | Germany | June 24, 1926 |